United States Patent [19]
Fischer et al.

[11] Patent Number: 5,934,619
[45] Date of Patent: *Aug. 10, 1999

[54] SATELLITE POSITIONING APPARATUS AND PROCESS

[75] Inventors: Horst-Dieter Fischer, Unterhaching; Joachim Chemnitz, Munich; Michael Surauer, Chieming, all of Germany

[73] Assignee: Daimler-Benz Aerospace AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,422

[22] Filed: Jun. 3, 1996

[30] Foreign Application Priority Data

Jun. 2, 1995 [DE] Germany ............... 195 197 32

[51] Int. Cl.⁶ .................................... B64G 1/26
[52] U.S. Cl. ................ 244/164; 244/169; 701/13
[58] Field of Search .................. 244/164, 165, 244/169; 701/13

[56] References Cited

U.S. PATENT DOCUMENTS

| | | | |
|---|---|---|---|
| 4,848,706 | 7/1989 | Garg et al. | 244/169 |
| 5,335,179 | 8/1994 | Boka et al. | 244/169 |
| 5,395,076 | 3/1995 | Lichtin et al. | 244/169 |
| 5,433,402 | 7/1995 | Surauer et al. | 244/169 |
| 5,458,300 | 10/1995 | Flament et al. | 244/169 |

*Primary Examiner*—Galen L. Barefoot
*Attorney, Agent, or Firm*—Evenson, McKeown, Edwards & Lenahan, P.L.L.C.

[57] ABSTRACT

In a process and apparatus for controlling the attitude of a spacecraft, drive signals for driving attitude control units of the spacecraft are generated based on control unit signals related to the three principle axes of a spacecraft oriented coordinate system, using the rule $k=B^I e+cu_2$. The drive matrix $B^I$, a definite vector $u_2$ and the constant c result from the application of a matrix decomposition according to the Singular Value Decomposition (SVD) method to a nozzle matrix B. The latter matrix contains as elements, the momentum and force vectors which can be generated by the attitude control units, and the drive matrix $B^I$ is multiplied directly with the vector e derived from the axis-related control unit signals.

7 Claims, 1 Drawing Sheet

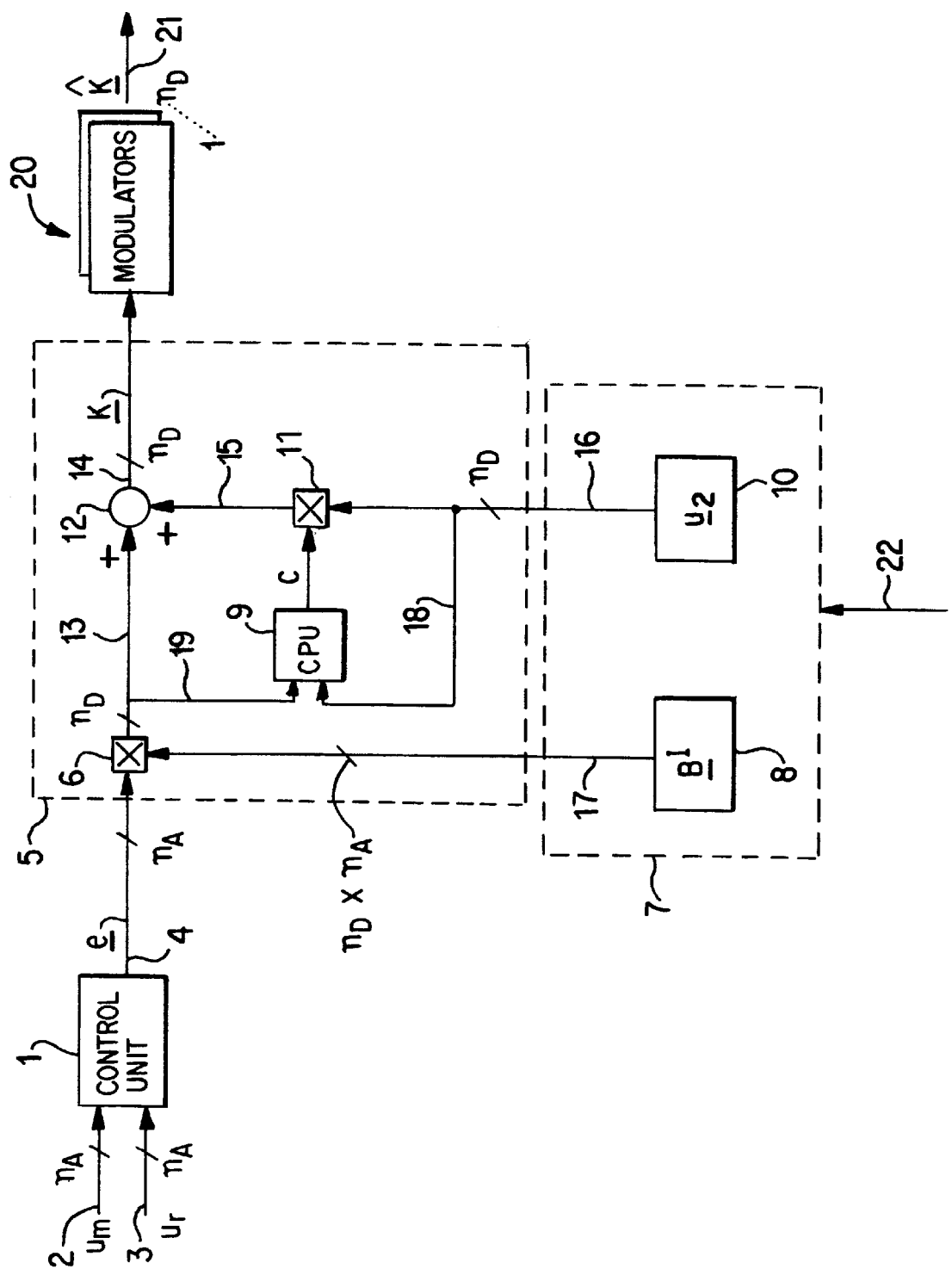

SATELLITE POSITIONING APPARATUS AND PROCESS

BACKGROUND AND SUMMARY OF THE INVENTION

This application claims the priority of German patent document 195 19 732.1, filed Jun. 2, 1995, the disclosure of which is expressly incorporated by reference herein.

This invention relates to an apparatus for controlling the attitude and position of a three axis stabilized spacecraft.

An apparatus and a process of this type are known from the article "Advanced Attitude and Orbit Control Concepts for 3-Axis-Stabilized Communication and Application Satellites" by M. Surauer, H. Bittner, W. Fichter and H. D. Fischer, IFAC Symposia Series 1993, No. 12.: *Automatic Control in Aerospace* (1992). FIG. 6.2-1 of that article illustrates the structure of an attitude control apparatus for a spacecraft, that has a control unit which processes measuring signals on the input side and emits control unit signals on the output side. Both the measuring and control unit signals are axis-related; that is, they are related to the three principal axes of the system of coordinates x, y, z fixedly assigned to the spacecraft. The axis-related control unit signals are supplied to a conversion unit called an "actuator command module" which, in turn, outputs a number of drive signals for attitude control nozzles, for generating positive and negative moments about the three principal axes as well as positive and negative forces along these principal axes.

Within the conversion unit, the control unit signals are first supplied to a delimiter and then to a total of three modulators which are also axis-related. The latter generate axis-related digital pulse sequences whose pulses may have the values 0 or ±1. In a nozzle selection unit which follows, these pulse sequences are converted into a number of non-negative control signals for the nozzles or the attitude control engines. (In the actual embodiment, four nozzles are provided.) This takes place by way of a table drive which receives as inputs all 27 possible combinations of the modulator output signals and, for this purpose, in each case, supplies fixed combinations of digital, nozzle-related drive signals, as indicated in Table 5.2.2 of the article.

However, this table drive has the disadvantage that a single signal triplet on the modulator output for the conversion requires two successive time intervals with a possibly different nozzle drive. In view of the permissible minimum pulse duration of the nozzles, this means a fifty percent reduction of the control unit sensitivity which is possible per se. In addition, the fact that three axis-related modulators are used constitutes a certain lack of flexibility because it is not possible in this manner to carry out a precise coordination of the features of the modulation process with the requirements of the individual nozzles or attitude control engines, such as may be desirable under certain circumstances.

It is an object of the invention to provide an apparatus of the initially mentioned type, which provides improved flexibility and control unit sensitivity.

In the initially mentioned apparatus described in the above-mentioned article, a process is used for generating drive signals for the nozzles or attitude control engines which is based on axis-related control unit signals and operates according to a rule which requires the application of a matrix decomposition (using the method of the Singular Value Decomposition (SVD), which is known per se) to a nozzle matrix. The latter, in turn, contains as elements the momentum and force vectors which can be generated by the nozzle or attitude control engines. This technique, which is explained in detail in Chapter 5.2.1 of the article, particularly under the partial heading "Torque Generation Logic" leads directly to the above-mentioned table drive. It takes into account the fact that, before generation of the nozzle-related drive signals, the axis-related control unit signals are supplied to the three axis-related modulators, so that the actual computation of the drive signals is based on the discrete signal triplet at the modulator outputs (that is, the modulator output vector). Accordingly, the axis-related modulator output vector consisting of discrete components occurs in the rule of computing resulting from the application of the above-mentioned matrix decomposition.

According to the invention, this process is now modified so as to eliminate the above-mentioned disadvantages. That is, in the process according to the invention, a modulator output vector is no longer used to determine the drive vector (consisting of the drive signals as the components). Rather, the vector of the axis-related control unit signals is used directly; for this purpose, it is multiplied with the drive matrix resulting from the SVD matrix decomposition.

In the known attitude control apparatus according to the initially cited article, the nozzles are always operated in a pulsed manner, as a result of the use of modulators addressed there. In contrast, according to another aspect of the invention, continuously controllable nozzles or attitude control engines can also be used, and the drive signals are used directly to actuate the respective thrust control mechanism of the nozzles or attitude control engines fixedly assigned to these drive signals.

Nozzles are those attitude control engines which operate with chemical fuels and are constructed predominantly for a pulsed operation, depending on the drive, with valves thereof being completely open or closed. However, such valves may also be constructed such that, according to a predetermined characteristic curve, they can take up continuously variable intermediate positions, and thus are also suitable for continuous drives. Furthermore, electric attitude control engines, such as ion engines, can also be used, in which the generated thrust is continuously variable.

The process for determining the drive signals for pulsed or continuously drivable nozzles arranged on a satellite or spacecraft as described below, has the following characteristics:

The number of drive signals is identical to the minimum number $n_D$ of the nozzles;

each of the $n_D$ drive signals is assigned precisely to a nozzle of the nozzle set (minimum circumference $n_D$);

the drive signals are non-negative, reflecting the fact that the thrust direction of a nozzle cannot be reversed;

the computation of the drive signals takes place from $n_A$ axis-related command signals by means of (i) a matrix $\underline{B}$ of the dimension $n_D \times n_A$, and (ii) a vector $\underline{u2}$ of the dimension $n_D$ according to the description mentioned below; the parameters $\underline{B}$ and $\underline{u2}$ required by the computing process are stored in the spacecraft computer and can be overwritten from the ground, or several sets of these parameters can be stored, for example, for the following cases: Change-over of the drive signals to redundant nozzles with other momentum (and force) vectors, or taking into account known changes of the spacecraft gravity center or of the thrust level of individual nozzles;

In the case of pulsed nozzles, each of the $n_D$ drive signals is supplied precisely to a modulation process or modulator assigned to the corresponding nozzle;

However, the drive process according to the invention uses an arrangement of pulsed or continuously drivable nozzles for generating torques or moments and forces on satellites or spacecraft which is characterized by the following features:

- the minimum number $n_D$ of nozzles is larger by one than the number $n_A$ of the axis-related actuating commands to be converted which correspond to the moments to be exercised about the three principal axes of the satellite. (In addition, forces along these principal axes may also be commanded; thus, $n_A \leq 6$.)
- the geometrical arrangement of the nozzles on the satellite or spacecraft permits the generating of positive and negative moments about up to three principal axes as well as possibly of positive and negative forces in the direction of up to three principal axes;
- for the special case $n_D \leq 4$ (additional feature), the following applies: the largest force components, of at least $n_D$ nozzles point in the same direction, which is the preferred direction for the thrust in the case of path correction maneuvers and the simultaneous generating of moments about $n_A = n_D - 1$ axes.

For attitude (and position) control of satellites or spacecraft by means of nozzles, normally control unit signals e are generated from measuring signals by means of suitable algorithms. The control unit signals e, multiplied by a desired moment matrix $T_{cmd}$ (and force matrix $F_{cmd}$), result in command vectors $t_{cmd}$ (and $f_{cmd}$ which, in turn, correspond to the moments (and forces) to be generated by the nozzles.

These axis-related command signals are to be converted into nozzle-related, non-negative drive signals k which are proportional to the thrust level of the respective nozzle to be generated on the average in a momentary manner.

The following relationship exists between the drive signals k for the nozzles and the forces and moments generated by them:

$$Z_{ges} = \frac{t}{f} = \frac{T}{F} \cdot k = \begin{matrix} \cdots r_i f_i \cdots \\ \cdots f_i \cdots \end{matrix} \cdot k, i = 1 \ldots n_D \quad (1)$$

or combined:

$$\underline{Z}_{ges} := \underline{B}_{ges} \cdot \underline{k}$$

with $\underline{Z}_{ges}$: combined moment and force vector, $\underline{t}$: mean moment exercised by the nozzles, $\underline{f}$: mean force exercised by the nozzles, $\underline{f}_i$: force vector of the nozzle i, $\underline{r}_i$: radius vector of the nozzle i, relative to the mass center $\underline{r}_i \underline{f}_i = \underline{r}_i \times \underline{f}_i$.

$k_i$: drive signal of the nozzle i.

A drive vector $\underline{k}$ is now sought which makes all elements of $\underline{z}_{ges}$ or a selected partial amount $\underline{z}$ thereof as nearly as possible identical to a predetermined command vector $\underline{z}_{cmd}$:

$$z_j = z_{cmdj}, j=1 \ldots n_A, n_A \leq 6 \quad (2)$$

Herein, $\underline{z}_{cmd}$ can be represented as the product of the $n_A$-element control unit output signal $\underline{e}$ with a desired moment/force matrix $\underline{B}_{cmd}$. As a result, equation (2) can be written as follows:

$$\underline{B}_{cmd} \underline{e} = \underline{B} \underline{k} \quad (3)$$

In this case, either $\underline{B} = \underline{B}_{ges}$, or $\underline{B}$ results from $\underline{B}_{ges}$ by eliminating the lines corresponding to those elements of $\underline{Z}_{ges}$ for which no desired value is indicated.

In the case of satellites and spacecraft, generally a desired value is given for the moments about all axes in order to avoid uncontrolled rotations. Normally, therefore $n_A \leq 3$ applies. The marginal condition $$k_i \leq 0, i=1 \ldots n_D \quad (4)$$

applies to the elements of $\underline{k}$ in (3). This corresponds to the fact that the nozzles can generate thrust in only one direction.

The minimal number of nozzles for which the equations (3) and (4) can be met at all is $$n_D = n_A + 1 \quad (5)$$

The process according to the invention generates exactly $n_D$ drive signals. It uses a matrix decomposition method (Singular Value Decomposition=SVD, known, for example, from *IEEE Transactions on Automatic Control*, Vol. AC-25, No. 2, April 1980, Pages 164 to 176) by means of which the nozzle matrix B in (3) can be represented as $$\underline{B} = \underline{V}(\quad, \underline{0}) \frac{\underline{U}1^T}{\underline{U}2^T} \quad (6)$$

For the case described here ($n_D = n_A + 1$), $\underline{U}2$ is a vector of the dimension $n_D$, in the following called $\underline{u}2$. If $\underline{u}2$ is definite (that is, it contains only components of the same preceding sign), the drive vector $\underline{k}$ will be determined as follows:

$$\underline{k} = \underline{B}^I \cdot \underline{e} + c \cdot \underline{u}2 \quad (7a)$$

$$c = -\min_i \{(\underline{B}^r \underline{e})_i / u2_i\} \quad (7b)$$

with $$\underline{B}^I = \underline{U}1 \quad {}^{-1} \cdot \underline{V}^T \cdot \underline{B}_{cmd} \quad (8)$$

The definiteness of the vector $\underline{u}2$ in equation (6) and (7) is the only demand on the nozzle matrix $\underline{B}$ so that the process described here can be used. (Note that the nozzle set is capable of generating positive and negative moments as well as possibly positive and negative forces along the respective required principal axes of the spacecraft or satellite.) In particular, the process described here requires no symmetry characteristics of the nozzle set (for example, that pairs of nozzles must in each case generate opposite moments of the same amount about a principal axis).

On the other hand, if $\underline{u}2$ is non-definite, there can be no process which would be suitable for controlling nozzle sets of the type used here, that is, which could meet requirements (2) and (4).

The process is preferably implemented in the satellite or spacecraft computer where the matrix $B^I$ as well as the vector $\underline{u}2$ from equation (7) are also stored.

The parameters $\underline{B}^I$ and $\underline{u}2$ can be overwritten from the ground by telecommand in order to be adapted to changes of the nozzle matrix $\underline{B}$. These may occur, for example, by:

a change in the center of mass in the operation;

a change of the thrust level of the nozzles; or a change-over to nozzles with a different installation geometry.

In this case, equation (7b) has the result that all drive signals are not negative. The drive law according to equation (7) therefore meets the requirements (2) and (4).

The suggested process generates a number $n_D$ of drive signals which are larger by one than the number of the axis-related moment and force commands $n_A$. Thus, in the simplest case, the number of nozzles used is equal to $n_D$. However, more than $n_D$ nozzles can also be used, for example, in the following cases:

To increase the moment level or thrust level, several nozzles with a similar moment vector and force vector can be combined assigned to one drive signal $k_i$. In this case, in equation (3) in the corresponding column of the matrix $\underline{B}$, the mean values of the relevant elements of the moment (and force) vectors of the combined nozzles must be used;

To increase the redundancy, elements of the vector $\underline{k}$ can optionally be used for driving different nozzles with a similar moment vector and force vector, or the vector $\underline{k}$ can be used for driving another set of nozzles with, on the whole, similar characteristics. In both cases, as required, the values of the parameters $\underline{B}^I$ and $\underline{u}2$ must be adapted by way of telecommands or must be replaced by values computed for the respective set of nozzles beforehand and stored in the spacecraft computer.

When pulsed nozzles are used, each of the determined control signals is supplied precisely to a modulator. The modulators may be digital (implemented, for example, in the spacecraft computer) or may be analog. The output signal of each modulator is appropriately used for actuating the valve (the valves) of the nozzle (group of nozzles with a similar momentum vector and force vector) which is fixedly assigned to this modulator.

When continuously controllable nozzles are used, each of the determined drive signals will appropriately be used to actuate the thrust control mechanism of the nozzle (or group of nozzles with a similar momentum and force vector) fixedly assigned to this drive signal.

If the largest force components of at least $n_D \leq 4$ nozzles point in the same direction, a constant thrust may be exercised in this direction, with the simultaneous generating of commanded moments about $n_D-1$ axes.

For $n_D=4$, for example, path correction maneuvers are possible with a simultaneous attitude control.

For this special case, the computing rule of the scalar c in equation (7b) can be expanded as follows:

Case a), valid outside of thrust phases or during thrust phases if $c_m \leq c_o$ ($c_m$ see case b)

$$c = c_o := -\min_i \{(\underline{B}^I \underline{e})_i / u2_i\} \quad 9a$$

Case b), valid during thrust phases, if $c_m > c_o$:

$$c = c_m := -\min_i \{1 - (\underline{B}^I \underline{e})_i / u2_i\} \quad 9b$$

In case a), the indefiniteness of the equation system (1) is utilized in order to meet the requirements (2) and (4) with minimal energy expenditures (the drive value zero is assigned to at least one nozzle); in case b), this takes place with maximal energy expenditures (the maximal drive value is assigned to at least one nozzle).

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic block diagram of an embodiment of the apparatus according to the invention.

DETAILED DESCRIPTION OF THE DRAWINGS

In this case, measuring signals $\underline{u}_m$ (which represent the attitude, and possibly the position, rotating rate and speed of the spacecraft) and corresponding desired values $u_r$ are input to a control unit 1 via feed lines 2 and 3. These measuring signals and desired values are axis-related; that is, they are related to the three principal axes of the system of coordinates x, y, z fixedly assigned to the spacecraft, as indicated with respect to each of the two lines 2 and 3 by means of the indication of the vector dimension $n_A$. According to a predetermined algorithm, the control unit 1 generates at its output a vector e of control unit signals, which also has the dimension $n_A$. The control unit signals are supplied via line 4 to a multiplication element 6, which also receives a matrix $\underline{B}^I$ of the type $n_D \times n_A$, by way of a line 17.

The multiplication element 6 is part of a conversion device 5 which, as additional control elements, also contains an adding element 12, another multiplication element 11 and a computing device 9. The matrix $\underline{B}^I$ is taken from a partial memory 8 of a memory 7 which, in another partial memory 10, contains a vector $\underline{u}_2$. Like the matrix $\underline{B}^I$, $\underline{u}_2$ originates from an SVD-matrix decomposition. (See equations (6) and (8) above.) By means of an arrow 22, it is indicated that the memory 7 (which, like the conversion device 5, is arranged in the spacecraft) , can be overwritten, for example by way of a telecommand from a ground station. The parameter values contained in the partial memories 8 and 10, as required, can therefore, as indicated above, be changed at any time and are then available for the further computations in the conversion device 5.

After multiplication of the two mentioned input quantities $\underline{e}$ and $\underline{B}^I$ in the multiplication element 6, a vectorial signal of the dimension $n_D$ appears at its output. This signal therefore contains as many components as there are nozzles ($n_D$) to be controlled. The line 13 therefore carries a signal which corresponds to the first term of the sum in the equation (7a). The second term of the sum is fed to the adjoining adding element 12 by way of a line 15. The output signal of the multiplication element 11 is fed to this line 15, which multiplication element 11 receives as input signals, on the one hand, the constant c computed in the computing unit 9 and, on the other hand, the vector $u_2$ of the dimension $n_D$ taken from the partial memory 10. On the one hand, the fist term of the sum of equation (7a) is supplied by way of line 19 to the computing unit 9 as an input signal and, on the other hand, the above-mentioned vector $u_2$ is supplied by way of line 18 to the computing unit 9 as an input signal. The output signal of the computing unit 9, specifically the constant c, is computed in this computing unit according to the rules of equations (7b) and (9a) or (9b).

Thus, a vector-shaped signal of the dimension $n_D$ is available on the output line 14 of the adding element 12, specifically the desired drive vector $\underline{k}$ whose components $k_i$ represent the desired drive signals for the $n_D$ individual nozzles, however, still in a continuously variable form.

If the nozzles provided as attitude control engines are to be operated in a pulsed manner, each individual scalar drive signal $k_i$ is supplied to a separate modulator. The vector $\underline{k}$ is therefore broken up in such a manner that each of its $n_D$ individual components is supplied to another modulator of an total modulator unit 20 which consists of a total of $n_D$ individual modulators, each of which is assigned to a different one of the $n_D$ nozzles. The total modulator unit 20 therefore, on the whole, contains a signal vector $\underline{k}$ whose $n_D$ components represent the discrete pulse sequences which are, in each case, to be supplied to the $n_D$ individual nozzles and which, as known, may assume values of 0 or ±1.

In the case of continuously drivable attitude control engines, the modulators are eliminated, and the drive vector k is supplied directly to the totality of these attitude control engines, specifically in such a manner that each of these engines contains a different one of the $n_D$ components of this vector as a drive signal for actuating its thrust control mechanism.

In front of its output for the $n_A$ components of its output signal, the control unit 1 may also contain a respective dead zone so that only those signals are transmitted which exceed minimum level that can be predetermined for the individual threshold value. As a result, a desired attitude precision can be predetermined in an axis-related manner. Furthermore, at the output of the adding element 12, a delimiter may be provided which limits the absolute value of the vector k to a predeterminable level, for example, 1. In this case, if required, the individual components of this vector are proportionally reduced to such an extent that the mentioned requirement can be met.

In the following, two examples will be indicated for computing a drive vector $\underline{k}$ which are to explain the approach of the computation by means of specific number examples.

Example a)

$n_a=3$; a 3-axis actuating moment is required, with $\underline{z}_{cmd}=\underline{t}_{cmd}=(t_x, t_y, t_z)$ $n_D=4$; that is, 4 nozzles are used $\underline{e}=(e_x, e_y, e_z)$ (axis-related control unit output signals)

Forces of the nozzles, $\underline{F}=(\underline{f}_1 \ldots \underline{f}_4)$ according to (1):

$$\underline{F} = \begin{pmatrix} 0.93102 & 0.92758 & 0.95368 & 0.95619 \\ 0.06 & -0.1 & -0.08 & 0.04 \\ -0.36 & -0.36 & -0.29 & 0.29 \end{pmatrix} [N]$$

Installation sites of the nozzles, $\underline{L}=(\underline{l}_1 \ldots \underline{l}_4)$:

$$\underline{L} = \begin{pmatrix} -0.889 & -0.889 & -0.889 & -0.889 \\ 0.448 & -0.448 & 0.574 & -0.574 \\ 0.605 & 0.605 & 0.477 & 0.477 \end{pmatrix} [m]$$

Mean gravity center of the satellite:

$\underline{C}=(0.036 -0.018\ 0.507)$ [m]

The result is the matrix of the nozzle moments which can be generated, $\underline{B} = \underline{T}\ (\ldots \underline{r}_i \underline{f}_i \ldots)$ according to (1), with (1), with $\underline{r}_i = \underline{l}_i - \underline{c}, i = 1 \ldots 4$:

$$\underline{B} = \begin{pmatrix} -0.1736 & 0.1646 & 0.1693 & -0.1600 \\ -0.2418 & -0.2421 & 0.2396 & 0.2396 \\ -0.4894 & 0.4914 & -0.4906 & 0.4946 \end{pmatrix} [Nm]$$

or by approximation:

$$\underline{B} = \left[ 2\begin{pmatrix} 0.17 & 0 & 0 \\ 0 & 0.24 & 0 \\ 0 & 0 & 0.49 \end{pmatrix} \right] \left[ (1/2)\begin{pmatrix} -1 & 1 & 1 & -1 \\ -1 & -1 & 1 & 1 \\ -1 & 1 & -1 & 1 \end{pmatrix} [\underline{\varepsilon}] [\underline{U}_1^T] \right]$$

This is an "ideal" moment matrix because the magnitude of the components in an axis are identical for all nozzles. As a result, this directly indicates the elements of the matrix decomposition $\Sigma$, $\underline{U}_1^T$, and $\underline{V}=\underline{I}$, according to (6)

The vector $\underline{u}2$ is obtained by orthogonally supplementing $\underline{U}1$ (Conditions: $|\underline{u}_2|=1$, $u_j^T u_2=0$ for $j=1 \ldots 3$) at $\underline{u}2^T=(\frac{1}{2})(1\ 1\ 1\ 1)$.

As the "desired moment matrix" $\underline{B}_{cmd}$ according to (3), the diagonal matrix of the moments is usefully selected which can be applied by a nozzle in one axis; thus, $B_{cmd}=(\frac{1}{2})\_=\text{diag}\ \{0.17\ 0.24\ 0.49\}$ [Nm]

Thus, the following is obtained as the drive matrix according to (8):

$$\underline{B}^I = (1/2)\underline{U}_1 = (1/4)\begin{pmatrix} -1 & -1 & -1 \\ 1 & -1 & 1 \\ 1 & 1 & -1 \\ -1 & 1 & 1 \end{pmatrix}$$

In the case of a control unit output signal of, for example, $\underline{e}=(1\ 1\ 1)^T$, the following is obtained, for example, for "on-modulation" (that is, no thrust in the preferred direction of the nozzles):

$\underline{B}^I\underline{e}=(\frac{1}{4})(-3\ 1\ 1\ 1)$, $c=3/2$ (according to (7b) or 9a)), $k=(0\ 1\ 1\ 1)^T$;

this results in a mean moment of the nozzles of $\underline{z}=(0.17\ 0.24\ 0.49)^T$ [Nm]

In the above example, a determination of c according to (9b) is not possible because the control unit output already forces a maximal thrust in the preferred direction of the nozzles; that is, the largest element of $\underline{k}$ is already equal to 1.

Generally, any value of c which is between those from (9a) and (9b) can be used for the drive according to (7a). This corresponds to a thrust in the principal force direction of the nozzles which can be controlled continuously between the minimum and the maximum.

Example b)

An ideal moment matrix as in Example a) is usually the result of a carefully selected nozzle installation geometry, taking into account the center of gravity of the satellite. In the case of gravity center migrations in the course of a mission, deviations from the ideal moment matrix cannot be avoided. Thus, for example, with the nozzle installation geometry of Example a) but with the gravity center $\underline{c}=(0.34 -0.017\ 0.468)^T$ [Nm], the moment matrix $$\underline{B} = \begin{pmatrix} -0.1756 & 0.1689 & 0.1721 & -0.1619 \\ -0.2047 & -0.2052 & 0.2763 & 0.2763 \\ -0.4883 & 0.4921 & -0.4898 & 0.4957 \end{pmatrix} [Nm]$$

is obtained.

For this purpose, the elements of the SVD according to (6) are obtained as well as the drive matrix $\underline{B}^I$ according to (8) as follows:

$$\underline{U}_1^T = \begin{pmatrix} -0.49783 & 0.50131 & -0.49715 & 0.50368 \\ -0.48985 & 0.51078 & 0.48695 & -0.51189 \\ 0.43151 & 0.41076 & -0.58039 & -0.55518 \end{pmatrix}$$

$$\underline{\ } = \text{diag}\{0.98398 \;\; 0.33916 \;\; 0.48665\} \;\; [Nm]$$

$$\underline{V} = \begin{pmatrix} 5.0716E-3 & 9.9942E-1 & -3.3695E-2 \\ 8.5953E-4 & -3.3699E-2 & -9.9943E-1 \\ 1.0 & -5.0398E-3 & 1.0299E-3 \end{pmatrix} E-x = 10^{-x}$$

$$\underline{u}_2 = (0.57097 \;\; 0.56486 \;\; 0.42293 \;\; 0.41958)^T$$

$$\underline{B}^I = \begin{pmatrix} -0.25090 & -0.20111 & -0.24913 \\ 0.25147 & -0.21453 & 0.25163 \\ 0.25033 & 0.27453 & -0.25711 \\ -0.24945 & 0.28595 & 0.25942 \end{pmatrix}$$

For $\underline{B}_{cmd}$ according to (3), the following values were selected here:

$$\underline{B}_{cmd} = \text{diag.} \{0.17 \;\; 0.24 \;\; 0.50\} \quad [Nm].$$

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Apparatus for controlling at least the attitude of a spacecraft relative to three principal axes of a system of coordinates fixedly assigned to the spacecraft, said apparatus comprising:

a control unit generating axis-related control unit signals from axis-related measuring signals;

attitude control units for generating at least positive and negative moments about the three principal axes; and a conversion unit for generating non-negative drive signals from the axis-related control unit signals, which drive signals are each assigned to the individual attitude control units; wherein, the attitude control units are driven in a pulsed manner;

each of the drive signals is fed to a different modulator, one such attitude control unit being connected to an output of each of the modulators in a fixed arrangement;

the conversion unit for implementing an operation generates output drive signals according to the equation $\underline{k} = \underline{B}^I \underline{e} + c \underline{u}_2$ $\underline{k}$ being a drive vector containing the drive signals as components, e being a vector containing the axis-related control unit signals as the components, $B^I$ being a drive matrix, and $u_2$ being a definite vector;

both $\underline{B}^I$ and $\underline{u}_2$ result from a matrix decomposition of a nozzle matrix B to be carried out according to the method of the Singular Value Decomposition (SVD); and $\underline{k}$ contains as elements the momentum and force vectors which can be generated by the attitude control units, and is finally selected such that all drive signals are not negative.

2. Apparatus for controlling at least the attitude of a spacecraft with respect to three principal axes of a system of coordinates fixedly assigned to the spacecraft, said apparatus comprising:

a control unit generating axis-related control unit signals from axis-related measuring signals;

attitude control units for generating at least positive and negative moments about the three principal axes;

a conversion unit for generating non-negative drive signals from the axis-related control unit signals, which drive signals are each assigned to the individual attitude control units; wherein, the attitude control units are continuously driven;

each particular drive signal is applied to actuate a thrust control mechanism of the attitude control engine fixedly assigned to the particular drive signal;

the conversion unit for implementing an operation generates output drive signals according to the equation $\underline{k} = \underline{B}^I \underline{e} + c \underline{u}_2$ $\underline{k}$ being a drive vector containing the drive signals as components, e being a vector containing the axis-related control unit signals as the components, $\underline{B}^I$ being a drive matrix, and $\underline{u}_2$ being a definite vector;

both $\underline{B}^I$ and $\underline{u}_2$ result from a matrix decomposition of a nozzle matrix B to be carried out according to the method of the Singular Value Decomposition (SVD); and $\underline{k}$ contains as elements the momentum and force vectors which can be generated by the attitude control units, and is finally selected such that all drive signals are not negative.

3. Apparatus according to claim 2, wherein:

the conversion device has a memory for receiving the drive matrix $\underline{B}^I$ as well as the definite vector $\underline{u}_2$; and said memory can be overwritten by a telecommand.

4. Process for generating drive signals, which form components of a drive vector k, for attitude control units of an apparatus for controlling the attitude of a spacecraft on the basis of control unit signals related to three principal axes of a system of coordinates fixedly assigned to the spacecraft, comprising:

using a rule, $\underline{k} = \underline{B}^I \underline{e} + c \underline{u}_2$, wherein a drive matrix $\underline{B}^I$, a definite vector $\underline{u}_2$ as well as a constant c result from the application of a matrix decomposition according to the method of Singular Value Decomposition (SVD) to a nozzle matrix B, which, as elements, contains the momentum and force vectors which can be generated by the attitude control units; and the drive matrix $\underline{B}^I$ is multiplied directly with the vector $\underline{e}$ derived from the axis-related control unit signals.

5. Apparatus according to claim 1 wherein said attitude control units comprise:

a minimum number $n_D$ of nozzles, $n_D$ being larger by one than a number of $n_A$ of axle-related actuating commands to be converted which correspond to the moments to be exercised about three principal axes of the satellite;

wherein said nozzles are arranged on the spacecraft in a configuration that permits generation of at least one of positive and negative moments and positive and negative forces aligned with a plurality of principal axes, and of positive and negative forces in the direction of such principal axes.

6. Arrangement according to claim 5 wherein:

$n_D \leq 4$; and force components, which are highest with respect to the amount, of at least $n_D$ nozzles point in the same direction, the preferred direction for the thrust in the case of path correction maneuvers and the simultaneous generating of moments about $n_A = n_D - 1$ axes.

7. Process according to claim 5 wherein each of the $n_D$ drive signals is supplied precisely to a modulation process or modulator assigned to a corresponding nozzle.

* * * * *